US009868536B2

(12) United States Patent
Miller et al.

(10) Patent No.: US 9,868,536 B2
(45) Date of Patent: Jan. 16, 2018

(54) ELECTRICAL INTERCONNECTS FOR ICE PROTECTION SYSTEMS

(71) Applicant: Goodrich Corporation, Charlotte, NC (US)

(72) Inventors: Lindsay Miller, Cuyahoga Falls, OH (US); James Mullen, Wadsworth, OH (US)

(73) Assignee: Goodrich Corporation, Charlotte, NC (US)

(*) Notice: Subject to any disclaimer, the term of this patent is extended or adjusted under 35 U.S.C. 154(b) by 683 days.

(21) Appl. No.: 14/160,698

(22) Filed: Jan. 22, 2014

(65) Prior Publication Data

US 2015/0114945 A1 Apr. 30, 2015

Related U.S. Application Data

(60) Provisional application No. 61/897,462, filed on Oct. 30, 2013.

(51) Int. Cl.
*H05B 3/02* (2006.01)
*B64C 27/46* (2006.01)
*B64D 15/12* (2006.01)
*B64C 27/467* (2006.01)

(52) U.S. Cl.
CPC ............ *B64D 15/12* (2013.01); *B64C 27/463* (2013.01); *B64C 27/467* (2013.01); *H05B 3/023* (2013.01)

(58) Field of Classification Search
CPC .............................. B64D 15/12; B64C 27/463
USPC .................................... 219/202, 541; 416/95
See application file for complete search history.

(56) References Cited

U.S. PATENT DOCUMENTS

| 2,464,273 | A | * | 3/1949 | Tanchel | B64D 15/12 244/134 D |
| 2,503,457 | A | * | 4/1950 | Speir | B64D 15/12 219/507 |
| 2,649,267 | A | * | 8/1953 | Luke | B64D 15/12 244/134 D |
| 2,665,090 | A | * | 1/1954 | Holdaway | B64D 15/12 174/124 R |

(Continued)

FOREIGN PATENT DOCUMENTS

| DE | 102008007910 A1 | 8/2008 |
| WO | WO-0079128 A1 | 12/2000 |

OTHER PUBLICATIONS

Search Report and Opinion issued by the European Patent Office dated Mar. 4, 2015 for European Patent Application No. 14190152.

(Continued)

*Primary Examiner* — Quang D Thanh
*Assistant Examiner* — Lawrence Samuels
(74) *Attorney, Agent, or Firm* — Locke Lord LLP; Scott D. Wofsy; Christopher J. Cillié

(57) ABSTRACT

A rotary blade includes a blade tip assembly with a first bus bar segment and a main blade assembly with second bus bar segment. The first bus bar segment is connected to the blade tip assembly and the second bus bar segment is connected to the main blade assembly. The blade tip assembly is connected to the main blade assembly such that the first and second bus bar segments are longitudinally offset from one another. A low-profile interconnect spans the first and second bus bar segments for resistively generating less heat than the bus bar segments for a predetermined current flow.

18 Claims, 3 Drawing Sheets

(56) References Cited

U.S. PATENT DOCUMENTS

| | | | | |
|---|---|---|---|---|
| 4,396,826 A * | 8/1983 | Orcutt | B32B 17/10018 | 156/273.9 |
| 5,306,874 A * | 4/1994 | Biron | H05K 3/4092 | 174/254 |
| 5,631,446 A * | 5/1997 | Quan | H01R 12/62 | 174/254 |
| 5,690,472 A * | 11/1997 | Lee | F01D 5/187 | 416/95 |
| 5,886,256 A * | 3/1999 | DeAnna | B64D 15/20 | 324/671 |
| 5,925,275 A * | 7/1999 | Lawson | B64D 15/12 | 219/543 |
| 6,145,787 A * | 11/2000 | Rolls | B64D 15/12 | 219/545 |
| 6,576,839 B1 * | 6/2003 | Pommer | H05K 3/4069 | 174/257 |
| 6,593,535 B2 * | 7/2003 | Gailus | H05K 3/308 | 174/255 |
| 6,603,079 B2 * | 8/2003 | Biron | H05K 1/148 | 174/254 |
| 6,612,810 B1 * | 9/2003 | Olsen | F03D 80/30 | 415/4.5 |
| 6,642,490 B2 * | 11/2003 | Feher | B64D 15/12 | 219/679 |
| 6,694,975 B2 * | 2/2004 | Schuster | A61M 15/00 | 128/203.26 |
| 7,291,815 B2 * | 11/2007 | Hubert | B64D 15/12 | 219/529 |
| 7,293,961 B2 * | 11/2007 | Lee | F01D 5/187 | 415/115 |
| 7,364,407 B2 * | 4/2008 | Grabau | F03D 1/065 | 416/229 R |
| 7,391,622 B2 * | 6/2008 | Marshall | B29C 35/0272 | 361/794 |
| 7,726,942 B2 * | 6/2010 | Mortensen | G01M 11/086 | 416/146 R |
| 7,766,620 B2 * | 8/2010 | Stam | F03D 1/0675 | 416/146 R |
| 7,789,620 B2 * | 9/2010 | Vontell, Sr. | F01D 5/18 | 415/178 |
| 7,942,640 B2 * | 5/2011 | Hiremath | F03D 1/0675 | 29/889.21 |
| 7,988,415 B2 * | 8/2011 | Hardison | F03D 1/00 | 416/146 R |
| 8,043,065 B2 * | 10/2011 | Kyriakides | F03D 1/0675 | 416/223 R |
| 8,342,805 B2 * | 1/2013 | Mendez Hernandez | F01D 11/00 | 244/1 A |
| 8,398,368 B2 * | 3/2013 | Battisti | F03D 7/042 | 416/1 |
| 8,535,006 B2 * | 9/2013 | Lee | | 416/97 R |
| 8,657,582 B2 * | 2/2014 | Hibbard | F03D 80/30 | 416/229 R |
| 8,834,117 B2 * | 9/2014 | Yarbrough | F03D 11/0033 | 416/146 R |
| 2003/0015524 A1 * | 1/2003 | Feher | B64D 15/12 | 219/703 |
| 2005/0180854 A1 * | 8/2005 | Grabau | F03D 1/065 | 416/241 R |
| 2008/0093118 A1 * | 4/2008 | Takahashi | H05K 3/4691 | 174/264 |
| 2009/0139739 A1 * | 6/2009 | Hansen | F03D 80/30 | 174/2 |
| 2009/0229876 A1 * | 9/2009 | Takahashi | H05K 3/4691 | 174/378 |
| 2009/0269205 A1 * | 10/2009 | Leahy | B64C 27/463 | 416/226 |
| 2010/0221111 A1 * | 9/2010 | Nieuwenhuizen | F03D 1/065 | 416/61 |
| 2010/0329865 A1 * | 12/2010 | Hibbard | F03D 80/30 | 416/146 R |
| 2010/0329881 A1 * | 12/2010 | Mendez Hernandez | F01D 11/00 | 416/230 |
| 2011/0052403 A1 | 3/2011 | Kawasetsu et al. | | |
| 2011/0084174 A1 * | 4/2011 | Hemmelgarn | B64C 3/48 | 244/200 |
| 2011/0211200 A1 * | 9/2011 | Cribbs | F03D 1/0675 | 356/614 |
| 2011/0217169 A1 * | 9/2011 | Becker | F03D 80/60 | 416/95 |
| 2012/0141277 A1 * | 6/2012 | Yarbrough | F03D 11/0033 | 416/146 R |
| 2013/0043342 A1 * | 2/2013 | Nordin | B64C 3/20 | 244/1 A |
| 2013/0149153 A1 * | 6/2013 | Fujioka | H02G 13/00 | 416/146 R |
| 2013/0149154 A1 * | 6/2013 | Kuroiwa | F03D 80/30 | 416/146 R |

OTHER PUBLICATIONS

Examination Report received from the European Patent Office dated Feb. 16, 2017 for Application No. 14190152.0.

* cited by examiner

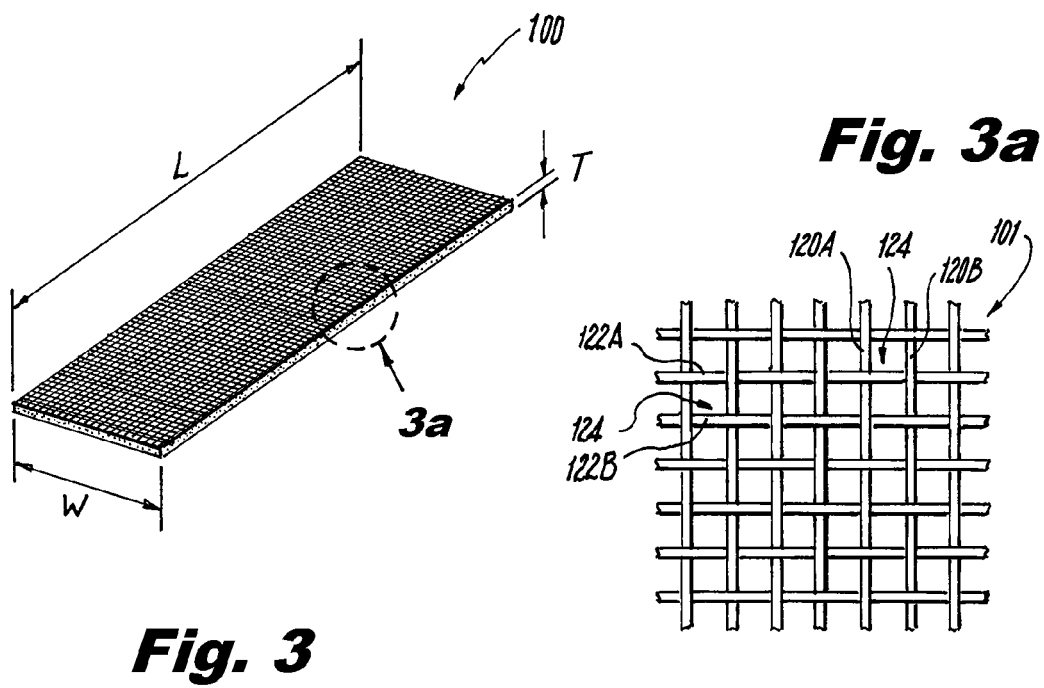
Fig. 3a
Fig. 3
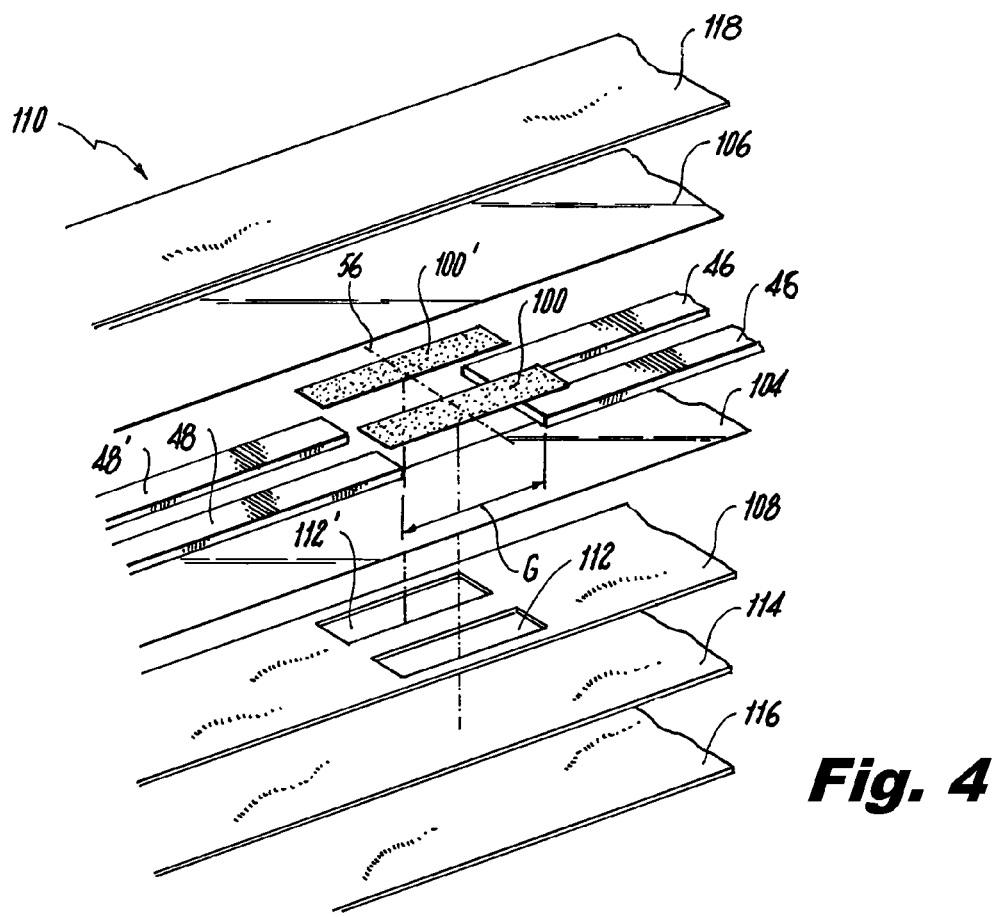
Fig. 4

ELECTRICAL INTERCONNECTS FOR ICE PROTECTION SYSTEMS

CROSS-REFERENCE TO RELATED APPLICATIONS

This application claims the benefit of U.S. Provisional Patent Application No. 61/897,462 filed Oct. 30, 2013, which is incorporated by reference herein in its entirety.

BACKGROUND OF THE INVENTION

1. Field of the Invention

The present disclosure relates generally to electrical interconnects, and more particularly to electrical interconnects for ice protection system heater elements.

2. Description of Related Art

Ice can accumulate on exposed surfaces of aircraft during operation in icing conditions, potentially changing aircraft handling qualities and performance. Some aircraft include ice protection systems for selectively heating portions of the aircraft surface to avoid ice accumulation or remove accumulated ice. Such systems generally include resistive heating elements arranged over aircraft surfaces that can be subject to icing, such as rotor blades. Interconnects typically couple each heating element to a power supply through bus segments that extend from the system power supply to the heating elements.

Rotor blades can include one or more heating elements arranged between the blade root and blade tip. Since blade tips can have a relative complex geometry, blade tips are generally constructed as a separate assembly that is attached to the main blade portion during blade assembly. In blade tip assemblies having integral heater elements, an electrical interconnect is generally necessary to couple to the heater element to the ice protection system power supply. Such interconnects are typically constructed from wire or wire braid, and electrically connect the tip assembly heater element to the main blade assembly bus. Wire or wire braid thickness (gauge) selection balances the requirements for low resistivity and flat blade surface contour, larger wire cross-sectional areas having lower resistivity but tending to form a high spot of the blade surface that can lead to mechanical separation or electrical failure during service. Balancing the competing needs of low resistivity and interconnect becomes more difficult when heater elements are connected in series as the interconnect need be sized to handle all the current traversing the heater element bus.

Conventional electrical interconnects have generally been considered satisfactory for their intended purpose. However, there is still a need in the art for interconnects that are electrically efficient and which do not induce discontinuities into the blade surface. There is also a need for interconnects that can carry as much current as the heater element or group of heater elements without generating excessive heat. The present disclosure provides a solution for these problems.

SUMMARY OF THE INVENTION

A rotary blade includes a blade tip assembly with a first bus bar segment and a main blade assembly with second bus bar segment. The first bus bar segment is connected to the blade tip assembly and the second bus bar segment is connected to the main blade assembly. The blade tip assembly is connected to the main blade assembly such that the first and second bus bar segments are longitudinally offset from one another. A low-profile interconnect spans the first and second bus bar segments for resistively generating less heat than the bus bar segments for a predetermined current flow.

In accordance with certain embodiments, the low-profile interconnect can be a mesh conductive body spanning a gap between the first and second bus bar segments. The mesh conductive body can also be pre-tinned and soldered at opposite ends to the first and second bus bar segments. A portion of the mesh conductive body can be disposed within the gap between the first and second bus bar segments. The rotary blade can define an aperture adjacent the gap, and a portion of the mesh conductive body can be disposed within the gap. The gap can have a depth that is about the same as the thickness of the mesh conductive body.

In certain embodiments, the low-profile interconnect can include a foil conductive body spanning a gap between the first and second bus bar segments. The foil conductive body can include an end portion defining a plurality of etched apertures disposed over and soldered to the first bus bar segment. The solder can extend contiguously about a perimeter of the aperture. The foil conductive body can include a contiguous body portion disposed in the gap between the first and second bus bar segments. The foil conductive body can have a thickness of about 0.003 inches.

It is contemplated that the mesh conductive body can have a thickness of about 0.010 inches. About 30% of the area of the mesh conductive body can be open area. An aerodynamic surface adjacent the conductive body and bus bars can have a uniform contour.

A composite rotary blade includes a blade tip assembly connected to a main blade assembly. A first bus bar segment connects to the blade tip assembly and a second bus bar segment connects to the main blade assembly. The first and second bus bar segments are longitudinally offset from one another. A mesh conductive body spans the first and second bus bar segments and resistively generates less heat through resistive heating than the bus bar segments for a predetermined current flow. A first adhesive ply underlies the first and second bus bar segments. A second adhesive ply overlays the first and second bus bar segments. A first structural ply underlies the first adhesive ply. A second structural ply underlies the first structural ply. A third structural ply underlies the second structural ply. A fourth structural ply overlays the second adhesive layer. The first structural ply defines an aperture arranged below the mesh conductive body for receiving the mesh conductive body.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 3 is perspective view of a jumper for the interconnect of FIG. 1, showing a jumper having a mesh conductive body;

FIG. 3A is partial plan view of the jumper of FIG. 3, showing interwoven conductive elements of the jumper;

FIG. 4 is an exploded view of an interconnect including the jumper of FIG. 3, showing construction of an interconnect incorporating the jumper in a composite rotary blade structure;

DETAILED DESCRIPTION OF THE PREFERRED EMBODIMENTS

Figure 1:
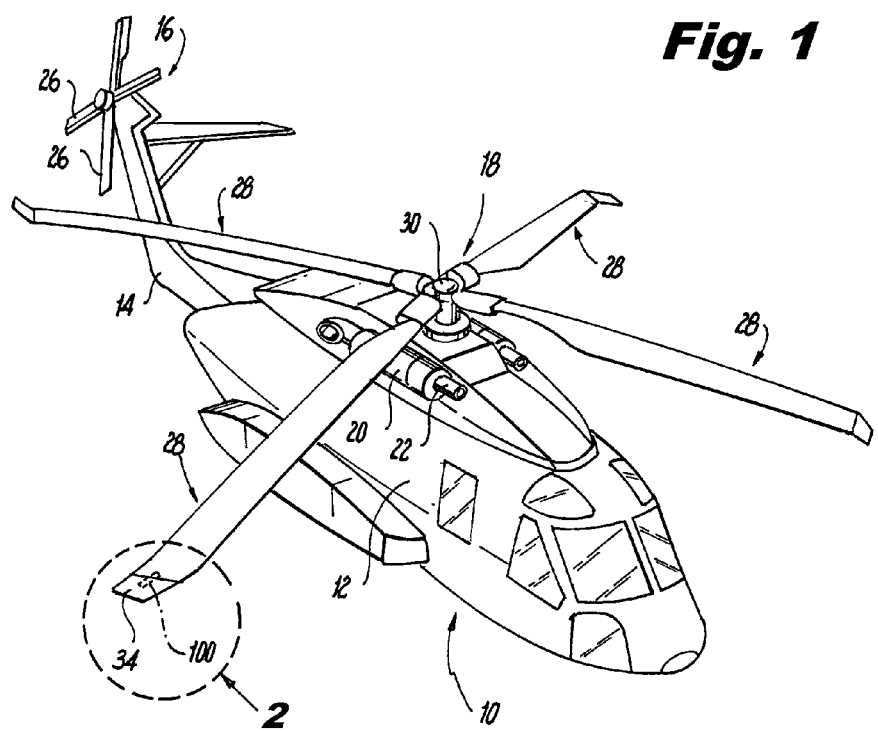
FIG. 1 is a perspective view of a helicopter including main rotor blades with low-profile interconnects in accordance with the present disclosure.

Reference will now be made to the drawings wherein like reference numerals identify similar structural features or aspects of the subject disclosure. For purposes of explanation and illustration, and not limitation, a partial view of an exemplary embodiment of a jumper in accordance with the disclosure is shown in FIG. 1 and designated generally by reference character 100. Other embodiments of the jumper in accordance with the disclosure, or aspects thereof, are provided in FIGS. 2-6, as will be described. The systems and methods described herein can be used to electrically connect resistive heater elements, such as in rotor blade anti-icing or de-icing systems for example.

FIG. 1 shows a rotary wing aircraft 10. Rotary wing aircraft 10 includes a fuselage 12 with a tail cone 14, a tail rotor assembly 16, and a main rotor assembly 18. Fuselage 12 houses at least one gas turbine engine 20 operative connected to a generator 22. Tail cone 14 connects tail rotor assembly 16 to fuselage 12. Tail rotor assembly 16 includes a plurality of tail rotor blades 26 operatively connected to gas turbine engine 20 by tail cone 14. Main rotor assembly 18 includes a plurality of main rotor blades 28 connected a rotor hub 30. Rotor hub 30 is operatively connected to gas turbine engine 20.

Each main rotor blade 28 includes a main blade assembly 32 and a blade tip assembly 34. Blade tip assembly 34 connects to main blade assembly 32. Main blade assembly 32 connects to rotor hub 30. Jumper 100 spans a joint 56 (shown in FIG. 2) between blade tip assembly 34 and main blade assembly 32. Rotary wing aircraft 10 includes an anti-icing/de-icing system including at least ice protection bus 36 (shown in FIG. 2) arranged over or within surfaces of the aircraft. The anti-icing/de-icing system includes one or more heater elements arranged on rotary blades of main rotor assembly 18, tail rotor assembly 16, or fuselage 12.

Figure 2:
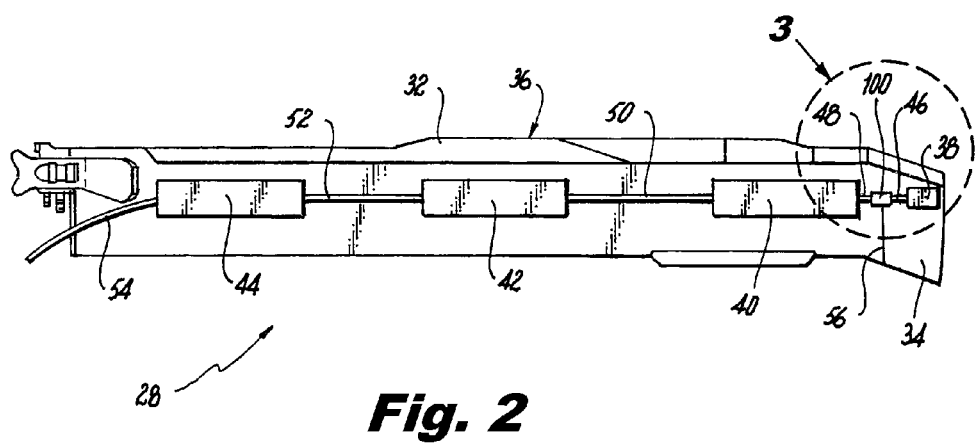
FIG. 2 is a plan view of a blade of FIG. 1, showing an interconnect spanning the joint between the blade tip assembly and the main blade assembly.

With reference to FIG. 2, main rotor blade 28 is shown. Main rotor blade 28 includes a main blade assembly 32 with inboard and outboard ends. Blade tip assembly 34 connects to the outboard end of main blade assembly 32, defining a joint 56 between the assemblies. Jumper 100 extends across joint 56 and provides an electrically conductive path between a heater element integrated into blade tip assembly 34 and generator 22. Main rotor blade 28 has surfaces that define smooth airfoil geometries configured for developing lift as main rotor assembly 18 rotates about fuselage 12. Blade tip assembly 34 has a structure that defines forward swept shape that diverges from main blade assembly 32. Although described herein in terms of an example main rotor blade assembly, other rotary blades such as tail rotors may also benefit from the interconnect assemblies described herein.

Main rotor blade 28 includes an ice protection bus 36. Ice protection bus 36 includes a plurality of heater elements electrically connected in series by a plurality of bus bar segments (illustrated schematically in FIG. 2). Ice protection bus 36 includes a first heater element 38, a second heater element 40, a third heater element 42, and a fourth heater element 44. Ice protection bus 36 also includes a first bus bar segment 46, a second bus bar segment 48, a third bus bar segment 50, a fourth bus bar segment 52, and a fifth bus bar segment 54. As will be appreciated by those skilled in the art, the number of heater elements, number of bus bar segments, and placement of each heater element and bus bar segment is as suitable for a given ice protection system application.

First heater element 38 is integrated into blade tip assembly 34. Second, third, and fourth heater elements 40, 42, and 44 are integrated into main blade assembly 32. Each heater element is formed of a conductive material configured for resistively generating heat from current flowing through the heating element. Each heater element can also be integrally constructed into a respective blade structure as part of a composite structure, such as DuraTherm® heater elements available from UTC Aerospace Systems of Charlotte, N.C.

First bus bar segment 46 is electrically connected to first heater element 38 and extends along tip assembly 34 to joint 56. Second bus bar segment 48 extends along main blade assembly 32 from joint 56 is electrically connects to second heater element 40. Third bus bar segment 50 extends along main blade assembly 32 and electrically connects second heater element 40 to third heater element 42. Fourth bus bar segment 52 also extends along main blade assembly 32 and electrically connects third heater element 42 to fourth heater element 44. Fifth bus bar segment 54 electrically connects fourth heater element 44 and generator 22 (shown in FIG. 1). The bus bar segments can be formed from a conductive sheet material integrally constructed into a respective blade structure as part of a composite structure, such as DuraTherm® bus bar segments available from UTC Aerospace Systems of Charlotte, N.C.

Rotor blade ice protection systems can require a separate blade tip assembly heater elements due to the divergent and/or complex geometry of the tip assembly. Such separate blade tip assembly heater element can be connected in series with heater elements of the main blade assembly. This avoids the need to run separate leads from the blade tip assembly to blade root—a distance which in some blades can be more than twenty feet. It also increases the current load carried across the interconnect spanning joint 56, generally driving a need for a jumper with a larger cross-sectional area to keep heat generation within acceptable limits. Illustrated ice protection bus 36 integrates a plurality of heater elements serially into a single bus. Jumper 100 electrically connects the separate blade tip assembly heater element, i.e. first heater element 38, to the main blade assembly heater elements by connecting to first bus bar segment 46 on one end and by connecting to second bus bar segment 48 on an opposed second end.

With reference to FIG. 3, jumper 100 is shown. Jumper 100 is constructed from an electrically conductive material, such as copper. Jumper 100 has a length L, a width W and a thickness T, thickness T being less than width W and length L. Jumper 100 is configured such that current flowing through jumper 100 generates less heat that the current flow generates in bus bar segments coupled to jumper 100.

Jumper 100 is preferably pre-tinned, that its mesh structure has a solder coating disposed over the conductive material. Pre-tinning jumper 100 can provide structural integrity during manipulation of jumper 100 during assembly.

With reference to FIG. 3A, jumper 100 has a mesh conductive body 101 formed from woven wire or wire cloth such as available from McMaster-Carr of Elmhurst, Ill. as part number 9224T87. Mesh conductive body 101 includes a first plurality of wires 120A and 120B interwoven with a second plurality of wires 122A and 122B. Wires 120A and 120B are substantially parallel to one another. Wires 122A and 122B are also substantially parallel to one another. Wires 120A and 120B intersect wires 122A and 122B at an angle of about 90 degrees. Wires 120A and 20B have a diameter of about 0.0045 inches (0.1143 millimeters). Wires 122A and 122B are similarly sized.

First plurality of wires 120A and 120B and second plurality of wires 122A and 122B form openings 124 therebetween. Openings 124 have an opening size about 0.006 inches (0.1524 millimeters). Because of the wire size and opening size, conductive body 101 has an open area of about 30% of the total area of mesh conductive body 101. This can provide access to solder receiving areas during attachment of jumper 100 to first and second bus bar segments 46 and 48 such that a solder joint having sufficient mechanical strength and conductivity between the elements can be formed. Interconnects fabricated using jumper 100 can have resistivity such that heat generation from current flow through jumper 100 is less than that generated by first and second bus bar segments 46 and 48 by current flowing through the bus bar segments and the heater elements.

With reference to FIG. 4, an electrical interconnect 110 including jumper 100 is shown. Interconnect 110 is a composite structure enveloping first and second bus bar segments 46 and 48 as well as jumper 100 into an integral, electrically conductive structure. First and second bus bar segments 46 and 48 are longitudinally staggered and define a gap G between opposed bus bar ends. Jumper 100 connects to each of the opposed bus bar ends, spanning gap G and electrically connecting the opposed bus bar ends.

Interconnect 110 is constructed as a layup including a first adhesive ply 104 and a second adhesive ply 106. First adhesive ply 104 underlays first and second bus bar segments 46 and 48 and jumper 100, longitudinally fixing each with respect to the other. Second adhesive ply 106 overlays bus bar segments 46 and 48 and jumper 100, longitudinally fixing each with respect to the other. First and second adhesive plies 104 and 106 can be double sided adhesive plies, for fixing the bus bars and jumpers to other structures. First and second adhesive ply 104 and 106 can be formed from a structural adhesive film material such as AF 163-2, available from 3M, Inc. of Minneapolis, Minn. under the trade name Scotch-Weld™.

Interconnect 110 also includes a first structural ply 108 having an aperture 112. First structural ply 108 underlays first adhesive ply 104 such that a portion of jumper 100 spanning gap G seats within aperture 112. In embodiments, jumper 100 has a thickness that is about the same as a thickness of first structural ply 108, a depth of aperture 112 thereby corresponding to thickness T of jumper 100. For example, jumper 100 and first structural ply can each have a thickness of about 0.010 inches (0.254 millimeters). This can allow for installation of jumper 100 into a rotor blade so as to form a low-profile interconnect, preventing the formation of a high spot on the surface of the rotor blade than potentially could lead to an electrical or mechanical bonding failure at the blade level. Aperture 112 can have a longitudinal length greater than gap G that is sized such that jumper 100 and opposed end portions of first and second bus bar segments 46 and 48 are received into gap G during fabrication of interconnect 110. This can also provide a low-profile electrical connection which increases reliability of interconnect 110 and provides an undisturbed overlying aerodynamic contour of the blade surface above interconnect 110. First structural ply 108 can be formed from a fiberglass and resin pre-impregnated material, such as 7781 fiberglass and CE-306 epoxy (CE306), available from E. I. du Pont de Nemours and Company of Wilmington, Del.

Interconnect 110 additionally includes a second structural ply 114 and a third structural ply 116. Second structural ply 114 underlays first structural ply 108, thereby supporting jumper 100 and opposed end portions of first and second bus bar segments 46 and 48. Third structural ply 116 underlays second structural ply 114, thereby providing additional support and strength to the overlaying elements. A fourth structural ply 118 overlays second adhesive ply 106, providing further support as well as a smooth surface contour. Second, third and fourth structural plies 114, 116, and 118 can also be constructed from CE306/7781, thereby allowing fabrication of interconnect 110 using a conventional vacuum bagging and heating composite layup cure processes. As will be appreciated by those skilled in the art, first, second and third structural plies 108, 114, 116 and 118 can be applied across joint 56 during blade assembly. Aperture 112 can be formed in first structural ply 108 by removing material from the ply approximating the thickness of jumper 100 in preparation for placement of jumper 100. Once the heater elements, bus bars and jumpers are positioned, second adhesive ply 106 and fourth structural ply 118 can be positioned such that the blade including ice protection bus 36 can be cured. As will also be appreciated, positive and negative legs of the bus can be formed in proximity to one another using similar operations.

As integrated into interconnect 110, jumper 100 generates less heat through resistive heating than first and second bus bar segments 46 and 48. First and second adhesive plies 104 and 106 as well as first, second, third and fourth structural plies 108, 114, 116 and 118 structurally support jumper 100. This arrangement can provide interconnects with electrical efficiency sufficient to carry the same current loads as the heater elements without experiencing resistive heating sufficient to reduce the reliability of the interconnect. The arrangement can also withstand the mechanical loadings typically experience by blade structure in the in the vicinity of joint 56. In aircraft having anti-icing and/or ice protection systems that cycle on and off during operation, this reduces the thermal stress and thermally induced fatigue associated in interconnect 110 from operation of the ice protection system.

Interconnect 110 forms a low-profile electrical connection. Embodiments of jumper body 101 having a thickness of about 0.010 inches (0.254 millimeters) can provide low-profile electrical connections by compensating for the jumper thickness by removing only a single layer of underlying dielectric ply material. This avoids distorting the overlying aerodynamic surface by creating a high spot which can potentially lead to electrical or mechanical bonding failure at the blade level.

Figure 5:
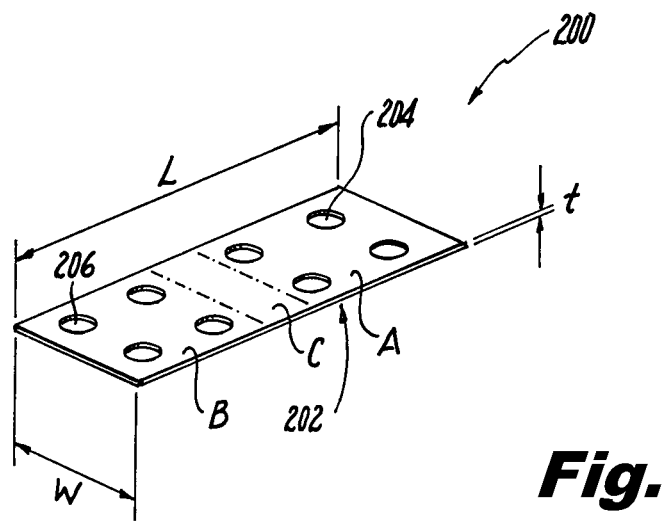
FIG. 5 is a perspective view of a second embodiment of the jumper for the interconnect, showing a jumper having a foil conductive body.

With reference to FIG. 5, a second embodiment of a jumper 200 is shown. Jumper 200 includes a conductive body 202 constructed from a sheet-like foil material. Conductive body 202 is constructed from copper or a copper containing alloy and has a length L, a width W, and a thickness T. Thickness T is smaller than width W and length L, and in an exemplary embodiment is about 0.003 inches (0.0762 millimeters). Thin conductive bodies can provide jumpers with resistivity sufficient for carrying as much current as the heater elements without generating excessive heat and low-profile interconnects that do not form high spots which potentially can cause electrical or mechanical bonding failure at the blade level. It can also simplify manufacturing as there is no need to remove material from the underlying layer to compensate for the thickness of jumper 200.

Conductive body 202 can be formed using an etching, milling or stamping process to define a plurality of open areas extending through conductive body 202. Once patterned, the surfaces and aperture perimeters are chemically etched to prepare the surfaces to receive solder to enhance bonding. As illustrated, conductive body 202 defines a plurality of apertures including first aperture 204 and second aperture 206. First aperture 204 extends through conductive body 202 between upper and lower surfaces of conductive body 202 in a first end portion A. First aperture 204 extends through conductive body 202 between upper and lower surfaces of conductive body 202 in a first end portion A. Second aperture 206 extends through conductive body 202 between upper and lower surfaces of conductive body 202 in a second end portion B. A contiguous (patternless) portion C of conductive body 202 is defined between first and second end portions A and B.

Figure 6:
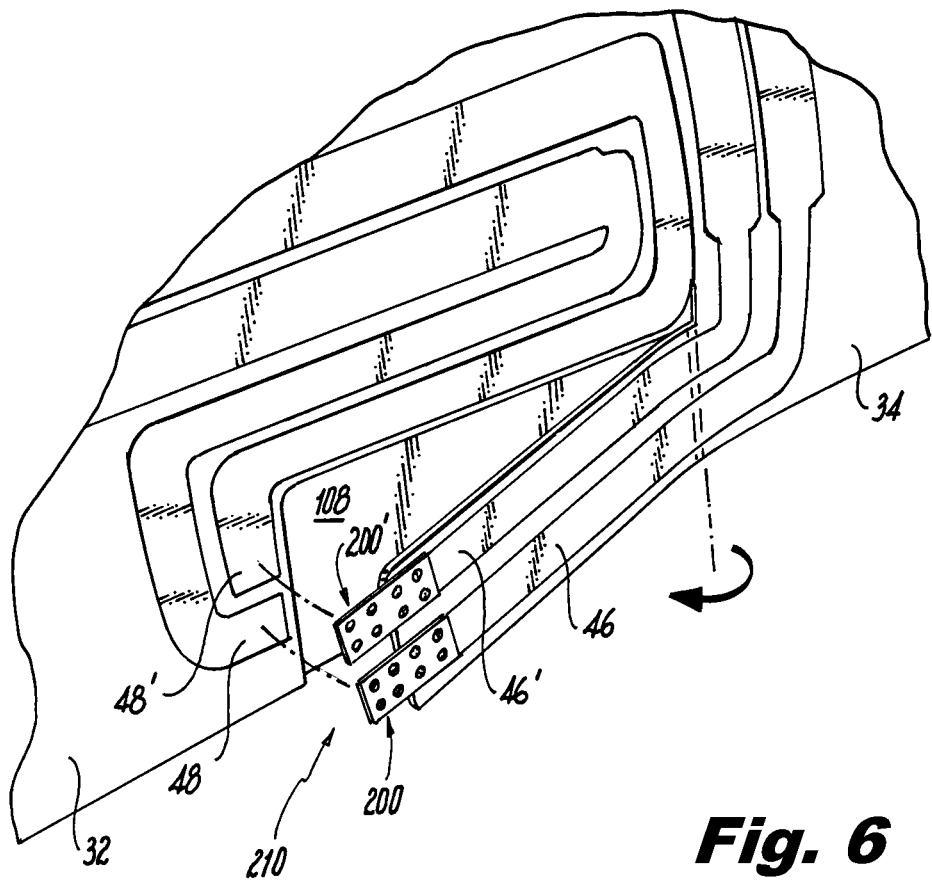
FIG. 6 is a perspective view of an interconnect including the jumper of FIG. 5, showing the jumper spanning bus bar segments on opposite sides of a joint defined between the main blade and blade tip assemblies.

With reference to FIG. 6, an interconnect 210 is shown during fabrication. Jumper 200 is soldered to first bus bar segment 46 at its first end portion A such that first aperture 204 is adjacent a surface portion of first bus bar segment 46. Solder is disposed at least about the perimeter of first aperture 204 and surface portion of first bus bar segment 46, thereby forming a substantially continuous bead about the perimeter of first aperture 204. As will be appreciated by those skilled in the art, the remaining apertures defined in first end portion A and second end portion B (eight shown for illustration purposes in FIG. 6) are similarly arranged and soldered to respective surface portions for first bus bar segment 46. Patterned jumpers with a contiguous bridge segment, i.e. with solid foil, spanning the gap between opposing bus bar segments can carry as much current as the bus bar segments without generating excessive heat. Thermograph imaging of embodiments of interconnect 210 shows a lower temperature in patternless portion C than shown in first and second bus bar segments 46 and 48 for a predetermined current flow. The open areas of jumper 200, e.g. first and second apertures 204 and 206 can facilitate solder flow through, providing reliable mechanical bonding and electrical connectivity. The open areas can also simplify manufacture and reliability of such interconnects by allowing for visual inspection of the solder connection about the perimeters of the apertures.

The methods and systems of the present disclosure, as described above and shown in the drawings, provide for electrical interconnects with superior properties including low resistive heating and low-profile connections. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A rotary blade, comprising:
a main blade assembly defining a longitudinal axis;
a blade tip assembly connected to the main blade assembly;
a first bus bar segment connected to the blade tip assembly;
a second bus bar segment connected to the main blade assembly, the first and second bus bar segments being longitudinally spaced from one another in a direction of the longitudinal axis; and
a low-profile interconnect, configured for avoiding distortion of an overlaying aerodynamic surface and resistively generating less heat than the bus bar segments at a predetermined current flow, spanning at least a portion of the first bus bar segment and at least a portion of the second bus bar segment, wherein the low-profile interconnect includes:
a structural ply defining an aperture, the aperture substantially spanning a longitudinal space between the bus bar segments in the longitudinal direction of the longitudinal axis; and
a conductive body disposed within the aperture, wherein the conductive body electrically connects the first bus bar segment with the second bus bar segment.

2. The rotary blade as recited in claim 1, wherein the conductive body includes a foil conductive body.

3. The rotary blade as recited in claim 2, wherein foil conductive body includes an end portion having a plurality of etched apertures disposed over and soldered to the first bus bar segment.

4. The rotary blade as recited in claim 3, wherein a solder extends contiguously about a perimeter of the plurality of apertures.

5. The rotary blade as recited in claim 2, wherein the foil conductive body includes a contiguous body portion.

6. The rotary blade as recited in claim 2, wherein the foil conductive body has a thickness of about 0.003 inches (0.0762 millimeters).

7. A rotary blade as recited in claim 1, wherein the conductive body includes a mesh conductive body spanning a gap between the first and second bus bar segments.

8. The rotary blade as recited in claim 7, wherein the mesh conductive body is pre-tinned and soldered at opposite ends to the first and second bus bar segments.

9. The rotary blade as recited in claim 7, wherein a portion of the mesh conductive body is disposed across a longitudinal joint defined between the first and second bus bar segments.

10. The rotary blade as recited in claim 7, wherein the aperture has a depth that is about the same as a thickness of the mesh conductive body.

11. The rotary blade as recited in claim 10, wherein the mesh conductive body has a thickness of about 0.010 inches (0.254 millimeters).

12. The rotary blade as recited in claim 7, wherein the mesh conductive body has about 30% open area.

13. The rotary blade as recited in claim 1, wherein a surface of the rotary blade overlying the low-profile interconnect has an undistorted aerodynamic contour longitudinally spanning the first bus bar segment and the second bus bar segment.

14. A composite rotary blade, comprising:
a main blade assembly defining a longitudinal axis;
a blade tip assembly connected to the main blade assembly, including:
a first bus bar segment connected to the blade tip assembly;
a second bus bar segment connected to the main blade assembly, the first and second bus bar segments being longitudinally spaced from one another in a longitudinal direction of the longitudinal axis;

a conductive body, configured for avoiding distortion of an overlaying aerodynamic surface and resistively generating less heat than the bus bar segments at a predetermined current flow, spanning abutting end portions of the first and second bus bar segments;

a first adhesive ply underlying first and second bus bar segments;

a second adhesive ply overlaying first and second bus bar segments;

a first structural ply underlying the first adhesive ply;

a second structural ply underlying the first structural ply;

a third structural ply underlying the second structural ply; and a fourth structural ply overlaying the second adhesive layer ply, wherein the first structural ply defines an aperture, the aperture substantially spanning a longitudinal space between the bus bar segments in the longitudinal direction of the longitudinal axis, wherein the conductive body is disposed within the aperture, and electrically connects the first bus bar segment with the second bus bar segment.

15. The main rotary blade as recited in claim 14, wherein the conductive body includes a foil conductive body, configured for avoiding distortion of an overlaying aerodynamic surface and resistively generating less heat than the bus bar segments at a predetermined current flow, spanning abutting end portions of the first and second bus bar segments.

16. A rotary blade, comprising:

a main blade assembly defining a longitudinal axis;

a blade tip assembly connected to the main blade assembly;

a first bus bar segment connected to the blade tip assembly;

a second bus bar segment connected to the main blade assembly, the first and second bus bar segments being longitudinally spaced from one another; and a low-profile interconnect, configured for avoiding distortion of an overlaying aerodynamic surface and resistively generating less heat than the bus bar segments at a predetermined current flow, spanning at least a portion of the first bus bar segment and at least a portion of the second bus bar segment, wherein the low-profile interconnect includes:

a structural ply defining an aperture with a depth corresponding to a thickness of the structural ply, the aperture substantially spanning a longitudinal space between the bus bar segments in the longitudinal direction of the longitudinal axis; and a conductive body wholly disposed within the aperture, wherein the conductive body has a thickness that is substantially equivalent to the depth of the aperture and electrically connects the first bus bar segment with the second bus bar segment.

17. A rotary blade, comprising:

a main blade assembly defining a longitudinal axis;

a blade tip assembly connected to the main blade assembly;

a first bus bar segment connected to the blade tip assembly;

a second bus bar segment connected to the main blade assembly, the first and second bus bar segments being longitudinally spaced from one another; and a low-profile interconnect, configured for avoiding distortion of an overlaying aerodynamic surface and resistively generating less heat than the bus bar segments at a predetermined current flow, spanning at least a portion of the first bus bar segment and at least a portion of the second bus bar segment, wherein the low-profile interconnect includes:

a structural ply defining an aperture with a depth corresponding to a thickness of the structural ply, the aperture substantially spanning a longitudinal space between the bus bar segments in the longitudinal direction of the longitudinal axis; and a conductive body disposed within the aperture and overlying end portions of the first and second bus bar segments, the conductive body electrically connecting the first bus bar segment with the second bus bar segment.

18. A rotary blade, comprising:

a main blade assembly defining a longitudinal axis;

a blade tip assembly connected to the main blade assembly;

a first bus bar segment connected to the blade tip assembly;

a second bus bar segment connected to the main blade assembly, the first and second bus bar segments being longitudinally offset from one another; and a low-profile interconnect, configured for avoiding distortion of an overlaying aerodynamic surface and resistively generating less heat than the bus bar segments at a predetermined current flow, spanning at least a portion of the first bus bar segment and at least a portion of the second bus bar segment, wherein the low-profile interconnect includes:

a structural ply defining an aperture with a longitudinal length, and a conductive body disposed within the aperture and spanning a gap defined between longitudinally opposed ends of the bus bars, wherein the longitudinal length of the aperture is greater than a longitudinal length of the gap, wherein the conductive body and end portions of the first and second bus bar segments are disposed within the gap, and wherein the conductive body electrically connects the first bus bar segment with the second bus bar segment.

* * * * *